US005312692A

United States Patent [19]

Shiraishi

[11] Patent Number: 5,312,692

[45] Date of Patent: May 17, 1994

[54] THERMAL IMAGE TRANSFER RECORDING MEDIUM

[75] Inventor: Shuhei Shiraishi, Mishima, Japan

[73] Assignee: Ricoh Company, Ltd., Tokyo, Japan

[21] Appl. No.: 884,211

[22] Filed: May 11, 1992

Related U.S. Application Data

[63] Continuation of Ser. No. 512,152, Apr. 20, 1990, abandoned.

[30] Foreign Application Priority Data

May 10, 1989 [JP] Japan ................................ 1-115118
Mar. 5, 1990 [JP] Japan ................................ 2-51827

[51] Int. Cl.$^5$ ................................ B32B 27/00

[52] U.S. Cl. ................................ 428/500; 428/195; 428/327; 428/331; 428/421; 428/447; 428/484; 428/488.4; 428/913; 428/914

[58] Field of Search ............... 428/195, 500, 913, 914, 428/331, 327, 421, 447, 488.4, 484

[56] References Cited

U.S. PATENT DOCUMENTS

| | | | |
|---|---|---|---|
| 3,368,989 | 2/1968 | Wissinger et al. | 260/23 |
| 4,592,946 | 6/1986 | Shuman | 428/488.4 |
| 4,708,903 | 11/1987 | Tanaka et al. | 428/488.4 |
| 4,792,496 | 12/1988 | Koshizuka et al. | 428/522 |
| 4,840,835 | 6/1989 | Ueyama et al. | 428/488.4 |
| 4,952,478 | 8/1990 | Miyagawa et al. | 428/195 |

FOREIGN PATENT DOCUMENTS

| | | |
|---|---|---|
| 272127 | 6/1988 | European Pat. Off. . |
| 3634049 | 4/1987 | Fed. Rep. of Germany . |
| 3932230 | 4/1990 | Fed. Rep. of Germany . |
| 2637095 | 3/1990 | France . |
| 62-23779 | 1/1987 | Japan . |
| 2227750 | of 0000 | United Kingdom . |

OTHER PUBLICATIONS

Patent Abstracts of Japan, vol. 11. No. 199 (M-602) (2646) Jun. 26 1987.

JP-A-62 23779 (Canon K.K.) Jan. 31, 1987.

*Primary Examiner*—Patrick J. Ryan
*Assistant Examiner*—William A. Krynski
*Attorney, Agent, or Firm*—Oblon, Spivak, McClelland, Maier & Neustadt

[57] ABSTRACT

A thermal image transfer recording medium comprising a support, and a thermal image transfer layer formed thereon, comprising as its main components an acrylic resin having a molecular weight of 1,000,000 or more and a glass transition temperature of 5° to 60° C., and a coloring agent. In the recording medium, a releasing layer comprising as its main component a wax having a melting point or softening point of 70° to 120° C. can be interposed between the support and the thermal image transfer layer; and an additional thermal image transfer layer comprising as its main component a thermoplastic resin whose glass transition temperature is equal to or higher than that of the acrylic resin contained in the thermal image transfer layer can also be interposed between the releasing layer and the thermal image transfer layer.

33 Claims, No Drawings

THERMAL IMAGE TRANSFER RECORDING MEDIUM

This application is a continuation of application Ser. No. 07/512,152, filed on Apr. 20, 1990, now abandoned.

BACKGROUND OF THE INVENTION

1. Field of the Invention

This invention relates to a thermal image transfer recording medium which has high thermal sensitivity and can yield images with high heat and abrasion resistances, and more particularly to a thermal image tranfer recording medium which can be used for printing images, for instance, on price tags for textile goods.

2. Discussion of Background

Conventionally known thermal image transfer layers (ink layers) of thermal image transfer recording media are as follows: (1) a thermal image transfer layer comprising an emulsified resin having a lowest film-forming temperature of 40° C. or more as disclosed in Japanese Laid-Open Patent Application 63-57679; (2) a thermal image transfer layer comprising as its main component a copolymer of styrene, methylmethacrylate and butylacrylate as disclosed in Japanese Laid-Open Patent Application 62-23779; (3) a thermal image transfer layer, formed on a transparent protective layer composed of a styrene-methacrylate copolymer and a polyvinyl chloride resin, comprising a styrene-methacrylate copolymer, polymethacrylate, a polyvinyl chloride resin and a coloring agent as disclosed in Japanese Laid-Open Patent Application 62-179992; and (4) a thermal image transfer recording layer, formed on a transparent protective layer made of a chlorinated polyolefin resin, comprising a (meth)acrylate polymer and a coloring agent as disclosed in Japanese Laid-Open Patent Application 63-42891.

The conventional thermal image transfer recording media comprising the above thermal image transfer layers cannot yield images having sufficiently high resistance to heat. Therefore, when they are used for printing images, for instance, on a price tag for clothing, which is commonly attached to clothing before the clothing is hot-pressed, the images printed on the price tag are blurred. Moreover, the ink of the images stains the clothing and also the price tag itself.

Namely, resins having a lowest film-forming temperature of 40° C. or more, which are used in the above-described thermal image transfer layer (1), are not necessarily high-heat-resistant. Therefore, images printed on a price tag attached to clothing by using the recording medium comprising such a resin are blurred when the clothing is hot-pressed at a temperature of approximately 100° C., and the price tag sticks to the clothing.

On the other hand, a resin having a lowest film-forming temperature of less than 40° C. is used, the thermal image transfer layer of the recording medium, when in the form of a rolled ribbon, sticks to the reverse side of the support which is in contact with the thermal image transfer layer in the roll even when preserved at room temperature. In other words, the so-called "blocking" occurs.

An emulsion of a resin having a high glass transition temperature, such as a polymethylmethacrylate resin, has a high lowest film-forming temperature. Therefore, a recording medium comprising such an emulsion in its image transfer layer cannot exhibit high thermal sensitivity. Moreover, images printed on a price tag attached to clothing by using such a recording medium are blurred, and the ink of the images stains both the clothing and the price tag when the clothing is hot-pressed at a temperature of 140° C. or more.

Furthermore, in the case where a thermal image transfer recording medium comprises in its thermal image transfer layer a wax having a low melting point as a binder, images printed by the recording medium on a price tag attached to clothing are blurred, and both the clothing and the price tag are stained by the ink of the images when the clothing is subjected to hot pressing. Therefore, such a recording medium is not suitable for image-printing on price tags for clothing.

When the thermal image transfer layer of (2), (3) or (4) comprises a resin having a high glass transition temperature, it exhibits low thermal sensitivity and images transferred from the layer on a price tag attached to clothing is suffered from low resistance to hot pressing conducted at a temperature of 140° C. or more. The thermal sensitivity can be improved by incorporating a resin having a low glass transition temperature, but doing so the resistance to hot pressing becomes worse.

In addition, the thermal image transfer layer (4) is formed on a protective layer made of a chlorinated polyolefin, so that images obtained from this layer cannot be expected to have high resistance to hot pressing.

SUMMARY OF THE INVENTION

Accordingly, an object of this invention is to provide a thermal image transfer recording medium which can yield images having high heat resistance, and more specifically, having high resistance to hot pressing conducted at a temperature of 140° C. or more.

Another object of this invention is to provide a thermal image transfer recording medium capable of yielding images with high abrasion resistance.

A further object of this invention is to provide a thermal image transfer recording medium having high thermal sensitivity.

These and other objects of the invention can be attained by (1) a thermal image transfer recording medium comprising a support, and a thermal image transfer layer formed thereon, comprising as its main components an acrylic resin having a molecular weight of 1,000,000 or more and a glass transition temperature of 5° to 60° C., and a coloring agent; (2) a thermal image transfer recording medium comprising a support, a releasing layer formed thereon, comprising as its main component a wax having a melting point or softening point of 70° to 120° C., and a thermal image transfer layer formed on the releasing layer, comprising as its main components an acrylic resin having a molecular weight of 1,000,000 or more and a glass transition temperature of 5° to 60° C., and a coloring agent; or (3) a thermal image transfer recording medium comprising a support, a releasing layer formed thereon, comprising as its main component a wax having a melting point or softening point of 70° to 120° C., a substantially colorless first thermal image transfer layer formed on the releasing layer, comprising as its main component a thermoplastic resin, and a second thermal image transfer layer formed on the first thermal image transfer layer, comprising as its main components an acrylic resin having a molecular weight of 1,000,000 or more and a glass transition temperature of 5° to 60° C., and a coloring agent, the glass transition temperature of the thermoplastic resin contained in the first thermal image transfer layer being equal to or higher than that of the acrylic resin contained in the second thermal image transfer layer.

DETAILED DESCRIPTION OF THE PREFERRED EMBODIMENTS

The thermal image transfer recording medium according to the present invention has high thermal sensitivity and is free from the problem of "blocking", and images obtained from the recording medium have high resistance to abrasion, to scratch and to hot pressing. Such good characteristics can be attained by properly selecting a kind of an acrylic resin to be incorporated into the thermal image transfer layer, its molecular weight and glass transition temperature.

In this Specification, the term "resistance to hot pressing" means that images printed on an image receiving sheet are not blurred, and the ink of the images stains neither the image receiving sheet nor any other materials which are brought into contact with the images when an article to which the image receiving sheet is attached is subjected to hot pressing.

The thermal image transfer recording medium of the first embodiment of the present invention comprises a support, and a thermal image transfer layer formed thereon, comprising as its main components an acrylic resin having a molecular weight of 1,000,000 or more and a glass transition temperature of 5° to 60° C., and a coloring agent.

As defined-above, the acrylic resin having a glass transition temperature of 5° to 60° C. is used in the present invention. When the recording medium comprises in its thermal image transfer layer an acrylic resin having a glass transition temperature of lower than 5° C., images obtained from the recording medium exhibit low resistance to hot pressing and to abrasion. On the other hand, an acrylic resin having a glass transition temperature of more than 60° C. imparts low thermal sensitivity to the recording medium.

Examples of the acrylic resins having a glass transition temperature of 5° to 60° C. usable in the present invention include polymers and copolymers of monomers such as methylacrylate, ethylacrylate, propylacrylate and butylacrylate. Copolymers of the above monomers and other monomers such as acrylic acid, methacrylic acid, methacrylate, acrylonitrile, styrene, vinyl chloride and vinyl acetate can also be used. These acrylic resins can be used either singly or in combination. It is preferable to use the acrylic resins in a state of emulsion.

Among the above acrylic resins, those having an extremely high molecular weight of 1,000,000 or more are employed in the present invention since they can impart high blocking resistance to the recording medium.

Examples of the coloring agents used in the thermal image transfer layer include pigments and dyes such as carbon black, red iron oxide, Lake Red C, Fast Sky Blue, Benzidine Yellow, Phthalocyanine Green, Phthalocyanine Blue, direct dyes, oil-soluble dyes, and basic dyes.

The amount of the coloring agent is preferably 10 to 20 wt. % of the total weight of the thermal image transfer layer.

A lubricant may be incorporated into the thermal image transfer layer, if necessary. Inorganic lubricants, and organic lubricants having a melting point of 140° C. or more are preferably employed.

Examples of the inorganic lubricants include talc, mica powder, molybdenum disulfide and graphite.

The inorganic lubricant having an average particle size of 0.1 to 5 μm is incorporated into the thermal image transfer layer. The amount of the inorganic lubricant is 1 to 50 wt. %, preferably 5 to 20 wt. %, of the total weight of the thermal image transfer layer.

Examples of the organic lubricants having a melting point of 140° C. or more include metal soaps such as lithium stearate, magnesium stearate, calcium stearate, strontium stearate, barium stearate, calcium laurate, barium laurate, lithium 12-hydroxystearate, calcium 12-hydroxystearate and zinc dibasic stearate, N-substituted fatty acid amides such as N,N'-ethylene-bis-12-hydroxystearic acid amide, N,N'-ethylene-bislauric acid amide, N,N'-methylene-bisstearic acid amide, N,N'-ethylene-bisstearic acid amide, N,N'-hexamethylene-bisstearic acid amide, N,N'-hexamethylenebisoleic acid amide, N,N'-distearyladipic acid amide and N,N'-distearylterephthalic acid amide, polytetrafluoroethylene, and a silicone resin.

The incorporation amount of the organic lubricant is 1 to 50 wt. %, preferably 1 to 10 wt. %, of the total weight of the thermal image transfer layer. The organic lubricant can be incorporated into a thermal image transfer layer by dissolving it into a mixture for forming the thermal image transfer layer, or dispersing finely-divided particles thereof having a diameter of 0.1 to 5 μm in the mixture.

The thickness of the thermal image transfer layer is approximately 0.5 to 5 μm. Resistance to scratch, in general, is poor when the thermal image transfer layer is thick.

The thermal image transfer recording medium of the second embodiment of the present invention comprises a support, a releasing layer formed thereon, comprising as its main component a wax having a melting point of softening point of 70° to 120° C., and a thermal image transfer layer formed on the releasing layer, which is the same as the one formed in the recording medium of the first embodiment of the present invention.

In the case where a wax having a melting point or softening point of lower than 70° C. is used, the wax absorbs most of a thermal energy which is applied to the recording medium when images are printed. Therefore, the thermal image transfer layer formed on the releasing layer cannot be sufficiently heated. As a result, the thermal image transfer layer cannot be well transferred to an image receiving sheet. On the other hand, when the melting point or softening point of the wax exceeds 120° C., releasing ability of the thermal image transfer layer upon printing images is decreased.

Examples of the wax contained in the releasing layer include carnauba wax, montan wax, ozocerite, microcrystalline wax, rice bran wax, ceresine wax, polyethylene wax, sazole wax and hardened castor oil.

The thickness of the releasing layer is preferably 0.1 to 3 μm. For the formation of the releasing layer on the support, the hot-melt method or coating method is employed.

Owing to the releasing layer, improvement of the image transfer efficiency at the time of thermal image transfer recording is attained, and clear images are obtained. Moreover, the releasing layer is transferred to an image receiving sheet together with the thermal image transfer layer, so that a wax layer is provided on the surface of the printed images. Thus, high hot-pressing resistance and abrasion resistance are imparted to the images.

The previously-mentioned lubricant may be incorporated into at least one of the releasing layer and the thermal image transfer layer.

The thermal image transfer recording medium of the third embodiment of the present invention comprises a support, a releasing layer formed thereon, which is the same as the one formed in the recording medium of the second embodiment of the present invention, a substantially colorless first thermal image transfer layer, formed on the releasing layer, comprising as its main component a thermoplastic resin, and a second thermal image transfer layer formed on the first thermal image transfer layer, which is the same as the thermal image transfer layer formed in the recording medium of the first embodiment or the second embodiment of the present invention. Thus, the first thermal image transfer layer may be referred to as an additional thermal image transfer layer to be interposed between the releasing layer and the thermal image transfer layer in the above second embodiment.

Thermoplastic resins having a glass transition temperature which is equal to or higher than that of the acrylic resins incorporated into the second thermal image transfer layer are used in the first thermal image transfer layer.

The first thermal image transfer layer can be formed by coating a solution or dispersion which is prepared by dissolving or dispersing the thermoplastic resin in water or a solvent, onto the surface of the releasing layer, followed by drying. The thickness of the first thermal image transfer layer is approximately 0.2 to 2 μm.

Examples of the thermoplastic resins usable in the first thermal image transfer layer include polystyrene, polyvinylcyclohexane, polystyrene derivatives such as those having a p-carbomethoxy group, an o-methyl group, a p-methyl group or a 2,4-dimethyl group, polydivinyl benzene, polyindene, polyvinylcarbazole, polyvinylformal, polyvinyl acetal, polyacrylonitrle, polymethacrylonitrile, polymethylmethacrylate, poly-tert-butylmethacrylate, polycyclohexylmethacrylate, polyethylene glycol methacrylate, polycarbonate, polyvinyl acetate, polymethylacrylate, polyethylacrylate, polypropylmethacrylate, poly-n-butylmethacrylate, polyethylene, polypropylene, a copolymer of monomers of the above polymers, and a copolymer of a monomer of the above polymers and other monomer such as vinyl chloride, vinyl acetate, acrylic acid, or ethylene.

The previously-mentioned lubricant may be incorporated into at least one of the releasing layer and the first thermal image transfer layer.

Aiming at improvement of thermal sensitivity of the recording medium and clearness of printed images, a thermofusible material may be incorporated into the second thermal image transfer layer. The thermofusible material, however, tends to impair hot-pressing resistance of the printed images. Therefore, the preferred amount of the thermofusible material is 20 wt. % or less of the total weight of the second thermal image transfer layer.

Examples of the thermofusible materials usable in the second thermal image transfer layer include carnauba wax, candelilla wax, paraffin wax, rice bran wax, microcrystalline wax, montan wax, ceresine wax, polyethylene wax, stearic acid and derivatives thereof.

The second thermal image transfer layer can be formed on the first thermal image transfer layer by coating a mixture prepared by dissolving or dispersing all the components of the second thermal image transfer layer in water or a solvent, followed by drying. The thickness of the second thermal image transfer layer is preferably 1 to 3 μm.

The support of the thermal image transfer recording medium according to the present invention is a plastics film such as a polyester film, a polycarbonate film, a polyimide film, an aromatic polyamide film containing 100% of aromatic polyamide, a polyether ether ketone film or a polysulfone film. The thickness of the support is approximately 3 to 10 μm.

In order to prevent the recording medium from sticking to a thermal head when images are printed and also to promote a smooth movement of the recording medium, a stick-preventing layer may be provided on the reverse side of the support, which is directly brought into contact with a thermal head.

Other features of this invention will become apparent in the course of the following description of exemplary embodiments, which are given for illustration of the invention and are not intended to be limiting thereof.

Example 1

A mixture having the following formulation was coated onto the surface of a polyester film support having a thickness of 4.5 μm to form a thermal image transfer layer having a thickness of 3 μm.

| [Formulation of Thermal Image Transfer Layer] | Parts by Weight |
|---|---|
| Emulsion of methylmethacrylate/-ethylacrylate copolymer (Tg = 30° C., M.W. = approx. 2,000,000, Solid matter = 50%) | 90 |
| Dispersion of carbon black | 10 |

Thus, thermal image transfer recording medium No. 1 according to the present invention was prepared.

Example 2

A mixture of 90 parts by weight of carnauba wax and 10 parts by weight of an ethylene - vinyl acetate copolymer was heated to a temperature of 120° C. This molten mixture was coated onto the surface of a polyester film support having a thickness of 4.5 μm to form a releasing layer having a thickness of 2 μm thereon.

Onto this layer was coated a mixture having the following formulation, thereby forming a thermal image transfer layer having a thickness of 1.5 μm.

| [Formulation of Thermal Image Transfer Layer] | Parts by Weight |
|---|---|
| Emulsion of ethylmethacrylate/-ethylacrylate copolymer (Tg = 20° C., M.W. = approx. 2,000,000, Solid matter = 50%) | 80 |
| Dispersion of carbon black | 20 |

Thus, thermal image transfer recording medium No. 2 according to the present invention was prepared.

Example 3

A releasing layer was formed on a polyester film support having a thickness of 4.5 μm in the same manner as in Example 2.

A mixture having the following formulation was coated onto the releasing layer to form a first thermal image transfer layer having a thickness of 0.5 μm.

| [Formulation of First Thermal Image Transfer Layer] | Parts by Weight |
|---|---|
| n-Butylmethacrylate resin (Tg = 20° C.) | 10 |
| Methyl ethyl ketone | 90 |

A mixture for forming a thermal image transfer layer, which was the same one as prepared in Example 2, was coated onto the surface of the first thermal image transfer layer to form a second thermal image transfer layer having a thickness of 1.5 μm.

Thus, thermal image transfer recording medium No. 3 according to the present invention was prepared.

Example 4

A releasing layer was formed on a polyester film support having a thickness of 4.5 μm in the same manner as in Example 2.

A mixture having the following formulation was coated onto the releasing layer to form a first thermal image transfer layer having a thickness of 0.5 μm.

| [Formulation of First Thermal Image Transfer Layer] | Parts by Weight |
|---|---|
| Ethylmethacrylate resin (Tg = 65° C.) | 10 |
| Methyl ethyl ketone | 90 |

A mixture for forming a thermal image transfer layer, which was the same one as prepared in Example 2, was coated onto the surface of the first thermal image transfer layer to form a second thermal image transfer layer having a thickness of 1.5 μm.

Thus, thermal image transfer recording medium No. 4 according to the present invention was prepared.

Example 5

A releasing layer was formed on a polyester film support having a thickness of 4.5 μm in the same manner as in Example 2.

A mixture having the following formulation was coated onto the releasing layer to form a first thermal image transfer layer having a thickness of 1.0 μm.

| [Formulation of First Thermal Image Transfer Layer] | Parts by Weight |
|---|---|
| Emulsion of ethylmethacrylate/-acrylonitrile copolymer (Tg = 70° C., Solid matter = 50%) | 80 |
| 10% Aq. polyvinyl alcohol solution | 20 |

A mixture for forming a thermal image transfer layer, which was the same one as prepared in Example 2, was coated onto the surface of the first thermal image transfer layer to form a second thermal image transfer layer having a thickness of 1.5 μm.

Thus, thermal image transfer recording medium No. 5 according to the present invention was prepared.

Example 6

A releasing layer is formed on a polyester film support having a thickness of 4.5 μm in the same manner as in Example 2.

Onto the releasing layer was coated a mixture having the following formulation, thereby forming a first thermal image transfer layer having a thickness of 0.5 μm.

| [Formulation of First Thermal Image Transfer Layer] | Parts by Weight |
|---|---|
| Ethylmethacrylate resin (Tg = 65° C.) | 10 |
| Methyl ethyl ketone | 90 |

A mixture having the following formulation was coated onto the surface of the first thermal image transfer layer to form a second thermal image transfer layer having a thickness of 1.5 μm.

| [Formulation of Second Thermal Image Transfer Layer] | Parts by Weight |
|---|---|
| Emulsion of methylmethacrylate/-methylacrylate copolymer (Tg = 30° C., M.W. = approx. 1,500,000, Solid matter = 50%) | 80 |
| Dispersion of carbon black | 20 |

Thus, thermal image transfer recording medium No. 6 according to the present invention was prepared.

Example 7

A releasing layer was formed on a polyester film support having a thickness of 4.5 μm in the same manner as in Example 2.

Onto this layer was coated a mixture having the following formulation, thereby forming a thermal image transfer layer having a thickness of 2.0 μm.

| [Formulation of Thermal Image Transfer Layer] | Parts by Weight |
|---|---|
| Emulsion of n-butylmethacrylate/-acrylonitrile copolymer (Tg = 40° C., M.W. = 2,000,000, Solid matter = 50%) | 60 |
| Emulsion of acrylate resin (Tg = 10° C., M.W. = 1,000,000, Solid matter = 50%) | 20 |
| Dispersion of carbon black | 20 |

Thus, thermal image transfer recording medium No. 7 according to the present invention was prepared.

Example 8

A releasing layer was formed on a polyester film support having a thickness of 4.5 μm in the same manner as in Example 2.

A mixture having the following formulation was coated onto the surface of the releasing layer to form a first thermal image transfer layer having a thickness of 1.0 μm.

| [Formulation of First Thermal Image Transfer Layer] | Parts by Weight |
|---|---|
| Emulsion of n-butylmethacrylate/-acrylonitrile copolymer (Tg = 30° C., Solid matter = 50%) | 20 |
| n-Butanol | 10 |
| Water | 70 |

Onto the first thermal image transfer layer was coated a mixture which was the same mixture for forming the thermal image transfer layer as prepared in Example 7, thereby forming a second thermal image transfer layer having a thickness of 1.2 μm.

Thus, thermal image transfer recording medium No. 8 according to the present invention was prepared.

Comparative Example 1

A mixture having the following formulation was coated onto the surface of a polyester film support having a thickness of 4.5 μm to form a thermal image transfer layer having a thickness of 3 μm.

[Formulation of Thermal Image Transfer Layer]

| | Parts by Weight |
|---|---|
| Emulsion of methylmethacrylate/-ethylacrylate copolymer (Tg = 30° C., M.W. = approx. 100,000, Solid matter = 50%) | 80 |
| Dispersion of carbon black | 20 |

Thus, comparative thermal image transfer recording medium No. 1 was prepared.

Comparative Example 2

A releasing layer was formed on a polyester film support having a thickness of 4.5 μm in the same manner as in Example 2.

A mixture having the same formulation as of the one for forming a thermal image transfer layer prepared in Comparative Example 1 was coated onto the releasing layer to form a thermal image transfer layer having a thickness of 1.5 μm.

Thus, comparative thermal image transfer layer No. 2 was prepared.

Comparative Example 3

A releasing layer is formed on a polyester film support having a thickness of 4.5 μm in the same manner as in Example 2.

Onto the releasing layer was coated a mixture having the following formulation, thereby forming a first thermal image transfer layer having a thickness of 0.5 μm.

[Formulation of First Thermal Image Transfer Layer]

| | Parts by Weight |
|---|---|
| Ethylmethacrylate resin (Tg = 65° C.) | 10 |
| Methyl ethyl ketone | 90 |

A mixture having the following formulation was coated onto the surface of the first thermal image transfer layer to form a second thermal image transfer layer having a thickness of 1.5 μm.

[Formulation of Second Thermal Image Tranfer Layer]

| | Parts by Weight |
|---|---|
| Emulsion of methylmethacrylate/-methylacrylate copolymer (Tg = 30° C., M.W. = approx. 100,000, Solid matter = 50%) | 80 |
| Dispersion of carbon black | 20 |

Thus, comparative thermal image transfer recording medium No. 3 was prepared.

A stick-preventing layer having a thickness of 0.1 μm was provided on the reverse side of the support of each of the thermal image transfer recording media Nos. 1 to 8 according to the present invention and the comparative thermal image transfer recording medima Nos. 1 to 3.

Namely, a liquid having the following formulation was coated onto the reverse side of the support of the recording medium, and then dried.

| | Parts by Weight |
|---|---|
| 30% Toluene Solution of Silicone rubber | 10 |
| Toluene | 90 |
| Hardening agent | 0.1 |

Images were transferred on an image receiving sheet from each of the above-prepared thermal image transfer recording media by using a thermal image transfer printer with a line-type thermal head. The image receiving sheet was a sheet of coated paper having a smoothness of 1000 seconds, and a thermal energy of 10 to 25 $mJ/mm^2$ was applied to the recording medium. The obtained samples were subjected to the following hot pressing test and abrasion test.

1. Hot Pressing Test

The test was carried out in accordance with JIS L 0850.

Namely, a piece of well dried white cotton cloth was overlaid on each of the samples. An electric iron heated to a temperature of 200° C was placed on the white cotton cloth for 15 seconds. The weight of the electric iron was approximately 25 $g/cm^2$.

Thereafter, the white cotton cloth was peeled off the sample, and the images on the image receiving sheet was visually observed whether or not they were blurred, and whether or not they had transferred to the surface of the white cloth. The results are shown in Table 1.

2. Abrasion Test

The test was carried out in accordance with JIS L 0849.

Namely, each of the samples was rubbed by a piece of well dried white cotton cloth by using a crockmeter. The rubbing was repeated 10 times reciprocatingly.

Thereafter, the images on the image receiving sheet was visually observed whether or not they were transferred to the surface of the white cloth. The results are shown in Table 1.

In addition to the above tests, blocking resistance of each of the recording media was observed. Namely, each of the recording media in the form of a rolled ribbon was preserved at 50° C. for 24 hours, and then visually observed whether or not blocking was caused in the roll of the recording medium.

TABLE 1

| Recording Medium | A | B | C | D | E |
|---|---|---|---|---|---|
| No. 1 | 22 | Δ | X | ○ | ○ |
| No. 2 | 17 | ○ | Δ | ○ | ○ |
| No. 3 | 17 | ○ | ○ | ○ | ○ |
| No. 4 | 17 | ○ | ○ | ○ | ○ |
| No. 5 | 19 | ○ | ○ | ○ | ○ |
| No. 6 | 18 | ○ | ○ | ○ | ○ |
| No. 7 | 18 | ○ | ○ | ○ | ○ |
| No. 8 | 17 | ○ | ○ | ○ | ○ |

TABLE 1-continued

| Recording Medium | A | B | C | D | E |
|---|---|---|---|---|---|
| Comp. No. 1 | 22 | Δ | X | ○ | X |
| Comp. No. 2 | 18 | ○ | Δ | ○ | X |
| Comp. No. 3 | 18 | ○ | ○ | ○ | X |

In the above table,
"A": Thermal sensitivity (mJ/mm²);
"B": Clearness of images printed on image receiving sheet,
○: images with good solid areas and clear-cut lines without blurr were obtained,
Δ: images with non-clear-cut images were obtained, and
X: images with poor solid areas and non-clear-cut lines with blurr were obtained;
"C": Resistance to hot pressing,
○: images underwent no change,
Δ: images were slightly transferred to white cloth, and
X: images were blurred, and were largely transferred to white cloth;
"D": Abrasion resistance,
○: images underwent no change and did not stained white cloth, and
X: images stained white cloth; and
"E": Blocking resistance,
○: no blocking was observed, and
X: blocking was observed.

The data shown in the above table clearly demonstrate that the thermal image transfer recording media according to the present invention have high blocking resistance and can yield images having high resistance to hot pressing and to abrasion.

What is claimed is:

1. A thermal image transfer recording medium comprising:

a support, and a thermal image transfer layer formed thereon consisting essentially of an acrylic resin having a molecular weight of 1 million or more and a glass transition temperature of 5 to 60° C., and a coloring agent, wherein the amount of said coloring agent is 10 wt % to 20 wt % of the total weight of said thermal image transfer layer and wherein said thermal image transfer layer has a thickness of 0.5 μm to 5 μm.

2. The thermal image transfer recording medium as claimed in claim 1, further comprising a releasing layer comprising a wax having a melting point or softening point of 70° to 120° C., which is interposed between said support and said thermal image transfer layer.

3. The thermal image transfer recording medium as claimed in claim 1, further comprising between said support and said thermal image transfer layer:

(a) a releasing layer formed on said support, comprising a wax having a melting point or softening point of 70° to 120° C., and (b) an additional thermal image transfer layer formed on said releasing layer, comprising a thermoplastic resin, said additional thermal image transfer layer being substantially colorless, said thermoplastic resin having a glass transition temperature equal to or higher than that of said acrylic resin contained in said thermal image transfer layer.

4. The thermal image transfer recording medium as claimed in claim 1, wherein said acrylic resin is selected from the group consisting of polymethylacrylate, polyethylacrylate, polypropylacrylate, polybutylacrylate, copolymers among methylacrylate, ethylacrylate, propylacrylate and butylacrylate, and copolymers of methylacrylate, ethylacrylate, propylacrylate or butylacrylate, and acrylic acid, methacrylic acid, methacrylate, acrylonitrile, styrene, vinyl chloride or vinyl acetate.

5. The thermal image transfer recording medium as claimed in claim 1, wherein said coloring agent is selected from the group consisting of carbon black, red iron oxide, Lake Red C, Fast Sky Blue, Benzidine Yellow, Phthalocyanine Green, Phthalocyanine Blue, direct dyes, oil-soluble dyes, and basic dyes.

6. The thermal image transfer recording medium as claimed in claim 1, wherein said thermal image transfer layer further comprises a lubricant.

7. The thermal, image transfer recording medium as claimed in claim 6 wherein said lubricant is an inorganic lubricant selected from the group consisting of talc, mica powder, molybdenum disulfide and graphite.

8. The thermal image transfer recording medium as claimed in claim 6 wherein said lubricant is an organic lubricant having a melting point of 140° C. or more, selected from the group consisting of lithium stearate, magnesium stearate, calcium stearate, strontium stearate, barium stearate, calcium laurate, barium laurate, lithium 12-hydroxystearate, calcium 12-hydroxystearate, zinc dibasic stearate, N,N'-ethylene-bis-12-hydroxystearic acid amide, N,N'-ethylene-bislauric acid amide, N,N'-methylenebisstearic acid amide, N,N'-ethylenebisstearic acid amide, N,N'-hexamethylene-bisstearic acid amide, N,N'-hexamethylene-bisoleic acid amide, N,N'-distearyladipic acid amide, N,N'-distearylterephthalic acid amide, polytetrafluoroethylene, and a silicone resin.

9. The thermal image transfer recording medium as claimed in claim 8, wherein the amount of said organic lubricant is 1 wt. % to 50 wt. % of the total weight of said thermal image transfer layer.

10. The thermal image transfer recording medium as claimed in claim 1, wherein said support is a plastics film selected from the group consisting of a polyester film, a polycarbonate film, a polyimide film, an aromatic polyamide film containing 100% of aromatic polyimide, a polyether ether ketone film and a polysulfone film.

11. The thermal image transfer recording medium as claimed in claim 1, wherein said support has a thickness of 3 μm to 10 μm.

12. The thermal image transfer recording medium as claimed in claim 2, wherein said wax is selected from the group consisting of carnauba wax, montan wax, ozocerite, microcrystalline wax, rice bran wax, ceresine wax, polyethylene wax, sazole wax, and hardened castor oil.

13. The thermal image transfer recording medium as claimed in claim 2, wherein said releasing layer has a thickness of 0.1 μm to 3 μm.

14. The thermal image transfer recording medium as claimed in claim 2, wherein at least one of said releasing layer and said thermal image transfer layer further comprises a lubricant.

15. The thermal image transfer recording medium as claimed in claim 14, wherein said lubricant is an inorganic lubricant selected from the group consisting of talc, mica powder, molybdenum disulfide and graphite.

16. The thermal image transfer recording medium as claimed in claim 15, wherein said inorganic lubricant has an average particle size of 0.1 μm to 5 μm.

17. The thermal image transfer recording medium as claimed in claim 15, wherein the amount of said inorganic lubricant is 1 wt. % to 50 wt. % of the total weight of the layer into which said inorganic lubricant is incorporated.

18. The thermal image transfer recording medium as claimed in claim 14, wherein said lubricant is an organic lubricant having a melting point of 140° C. or more, selected from the group consisting of lithium stearate, magnesium stearate, calcium stearate, strontium stearate, barium stearate, calcium laurate, barium laurate, lithium 12-hydroxystearate, calcium 12-hydroxystearate, zinc dibasic stearate, N,N'-ethylene-bis-12-hydroxystearic acid amide, N,N'-ethylene-bislauric acid amide, N,N'-methylenebisstearic acid amide, N,N'-ethylenebisstearic acid amide, N,N'-hexamethylene-bisstearic acid amide, N,N'-hexamethylene-bisoleic acid amide, N,N'-distearyladipic acid amide, N,N'-distearylterephthalic acid amide, polytetrafluoroethylene, and a silicone resin.

19. The thermal image transfer recording medium as claimed in claim 19, wherein the amount of said organic lubricant is 1 wt. % to 50 wt. % of the total weight of the layer into which said organic lubricant is incorporated.

20. The thermal image transfer recording medium as claimed in claim 3, wherein said additional thermal image transfer layer has a thickness of 0.2 μm to 2 μm.

21. The thermal image transfer recording medium as claimed in claim 3, wherein at least one of said releasing layer and said additional thermal image transfer layer further comprises a lubricant.

22. The thermal image transfer recording medium as claimed in claim 21, wherein said lubricant is an inorganic lubricant selected from the group consisting of talc, mica powder, molybdenum disulfide and graphite.

23. The thermal image transfer recording medium as claimed in claim 22, wherein said inorganic lubricant has as average particle size of 0.1 μm to 5 μm.

24. The thermal image transfer recording medium as claimed in claim 22, wherein the amount of said inorganic lubricant is 1 wt. % to 50 wt. % of the total weight of the layer into which said inorganic lubricant is incorporated.

25. The thermal image transfer recording medium as claimed in claim 21, wherein said lubricant is an organic lubricant having a melting point of 140° C. or more, selected from the group consisting of lithium stearate, magnesium stearate, calcium stearate, strontium stearate, barium stearate, calcium laurate, barium laurate, lithium 12-hydroxystearate, calcium 12-hydroxystearate, zinc dibasic stearate, N,N'-ethylene-bis-12-hydroxystearic acid amide, N,N'-ethylene-bislauric acid amide, N,N'-methylenebisstearic acid amide, N,N'-ethylenebisstearic acid amide, N,N'-hexamethylene-bisstearic acid amide, N,N'-hexamethylene-bisoleic acid amide, N,N'-distearyladipic acid amide, N,N'-distearylterephthalic acid amide, polytetrafluoroethylene, and a silicone resin.

26. The thermal image transfer recording medium as claimed in claim 25, wherein the amount of said organic lubricant is 1 wt. % to 50 wt. % of the total weight of the layer into which said organic lubricant is incorporated.

27. The thermal image transfer recording medium as claimed in claim 3, wherein said thermal image transfer layer has a thickness of 1 μm to 3 μm.

28. The thermal image transfer recording medium as claimed in claim 3, wherein said thermal image transfer layer further comprises a thermofusible material selected from the group consisting of carnauba wax, candelilla wax, paraffin wax, rice bran wax, microcrystalline wax, montan wax, ceresine wax, polyethylene wax, stearic acid and derivatives thereof.

29. The thermal image transfer recording medium as claimed in claim 28, wherein the amount of said thermofusible material contained in said thermal image transfer layer is 20 wt. % or less of the total weight of said thermal image transfer layer.

30. The thermal image transfer recording medium as claimed in claim 7, wherein said inorganic lubricant has an average particle size of 0.1 μm to 5 μm in an amount of 1–50 wt. % of the total weight of said thermal image transfer layer.

31. A thermal image transfer recording medium comprising:

a support, and a thermal image transfer layer formed thereon consisting essentially of an acrylic resin having a molecular weight of from 1,000,000 to 2,000,000 and a glass transition temperature of 5°–60° C., and a coloring agent, wherein 1) the amount of said coloring agent is 10 wt. % to 20 wt. % of the total weight of said thermal image transfer agent, 2) said thermal image transfer layer has a thickness of 0.5 μm to 5 μm and 3) said substrate has a thickness of 3 μm to 10 μm.

32. A thermal image transfer recording medium as claimed in claim 1 comprising:

a support, and a thermal image transfer layer formed thereon consisting of an acrylic resin having a molecular weight of 1,000,000 or more and a glass transition temperature of 5°–60° C., and a coloring agent.

33. A thermal image transfer recording medium comprising:

a support, and a thermal image transfer layer formed thereon consisting of an acrylic resin having a molecular weight of from 1,000,000 to 2,000,000 and a glass transition temperature of 5°–60° C., and a coloring agent, wherein 1) the amount of said coloring agent is 10 wt. % to 20 wt. % of the total weight of said thermal image transfer agent, 2) said thermal image transfer layer has a thickness of 0.5 μm to 5 μm and 3) said substrate has a thickness of 3 μm to 10 μm.

* * * * *

UNITED STATES PATENT AND TRADEMARK OFFICE
CERTIFICATE OF CORRECTION

PATENT NO. : 5,312,692

DATED : MAY 17, 1994

INVENTOR(S) : Shuhei SHIRAISHI

It is certified that error appears in the above-identified patent and that said Letters Patent is hereby corrected as shown below:

Column 5, line 40, "nitrle" should read --nitrile--.

Column 5, line 56, "inage" should read --image--.

Column 10, line 5, "medima" should read --media--.

Column 11, line 12, "blurr" should read --blur--.

Column 11, line 14, "blurr" should read --blur--.

Column 11, line 18, "stained" should read --stain--.

Column 13, line 17, "Claim 19" should read --Claim 18

Signed and Sealed this

Thirteenth Day of June, 1995

Attest:

BRUCE LEHMAN

*Attesting Officer* — *Commissioner of Patents and Trademarks*